(12) United States Patent
Hogan (10) Patent No.: US 7,857,685 B2
(45) Date of Patent: Dec. 28, 2010

(54) APPARATUS AND METHOD FOR PREPARING FOOD

(76) Inventor: Karen Hogan, 1452 Crown Ter., Marietta, GA (US) 30062

( * ) Notice: Subject to any disclaimer, the term of this patent is extended or adjusted under 35 U.S.C. 154(b) by 2130 days.

(21) Appl. No.: 10/667,680

(22) Filed: Sep. 22, 2003

(65) Prior Publication Data

US 2004/0101599 A1  May 27, 2004

(51) Int. Cl.
*A22C 9/00* (2006.01)
(52) U.S. Cl. .................................................. 452/141
(58) Field of Classification Search ......... 452/141–144; 426/106, 111–114, 119, 120, 125, 129; 383/100, 383/101, 105, 35
See application file for complete search history.

(56) References Cited

U.S. PATENT DOCUMENTS

| | | | |
|---|---|---|---|
| 2,778,173 A * | 1/1957 | Taunton ....................... 53/427 |
| 2,917,223 A * | 12/1959 | Le Bolt et al. ................. 383/32 |
| 3,760,940 A * | 9/1973 | Bustin ......................... 383/35 |
| 4,242,774 A | 1/1981 | Massaro |
| 4,550,546 A * | 11/1985 | Raley et al. ................... 53/425 |
| 4,561,109 A | 12/1985 | Herrington |
| 4,723,956 A | 2/1988 | Schnell et al. |
| 4,867,995 A | 9/1989 | Oaks |
| 4,939,151 A * | 7/1990 | Bacehowski et al. ......... 435/402 |
| 5,167,454 A * | 12/1992 | Woods et al. .................. 408/71 |
| 5,393,261 A | 2/1995 | Winton |
| RE34,929 E * | 5/1995 | Kristen ..................... 206/524.8 |
| 6,126,013 A * | 10/2000 | Miller ......................... 206/591 |
| 6,212,716 B1 * | 4/2001 | Logan et al. ................... 5/644 |
| 6,403,174 B1 * | 6/2002 | Copeta ....................... 428/34.1 |
| 6,550,966 B1 * | 4/2003 | Saad et al. ................... 383/103 |

* cited by examiner

*Primary Examiner*—Thomas Price
(74) *Attorney, Agent, or Firm*—Woodcock Washburn LLP (57) ABSTRACT

An apparatus and method for selectively or contemporaneously tenderizing and marinating meats or other desired food items, wherein implementation of the present method entails application of a sealable apparatus having a mechanical tenderizing assembly incorporated therein, thus permitting the sequestration and containment of raw meat juices, meat particulate, and/or marinade therewithin during the tenderizing process, thereby eliminating leakage and/or splatter of same, and reducing or eliminating associated bacterial proliferation and contamination of surrounding surfaces or food items.

19 Claims, 7 Drawing Sheets

APPARATUS AND METHOD FOR PREPARING FOOD

TECHNICAL FIELD

The present invention relates generally to food preparatory devices, and more specifically to an apparatus and method for selectively or contemporaneously tenderizing and marinating meats or other selected food items. In view of conventional meat tenderizing devices and methods, the present invention is particularly advantageous for its ability to preclude the splatter of raw meat juices during the tenderizing process, and thus reduce the proliferation of harmful bacteria commonly associated therewith.

BACKGROUND OF THE INVENTION

Often times, tough meats must be "softened" or tenderized to facilitate the preparation, cooking and subsequent consumption of same. Tenderizing meat essentially entails utilizing mechanical, chemical or marinating processes to break down the meat's muscle fibers and connective tissue, and/or to denature or "unwind" the long protein strands thereof, thereby yielding a more malleable and tender meat.

In particular, a popular method of mechanically tenderizing meat involves striking or pounding the meat via a heavy tenderizing mallet having a series of pointed protrusions extending therefrom for forcefully piercing the meat, thereby breaking down the meat's muscle fiber with each strike of the mallet thereto. Similar mechanical utensils are available in the form of metal or wooden bats, flat-faced mallets, or other suitable implements. Additionally, those without such mallets, or as alternative thereto, may often utilize a large metal pan to strike the meat, thereby effectuating a wider, more evenly distributed tenderizing impact.

Other mechanical tenderizing devices incorporate hinged upper and lower metal plates, each such plate having a series of tenderizing teeth protruding therefrom. Such devices function specifically as meat tenderizing presses, wherein the repeated, hinged movement or lowering of the upper plate toward the lower plate imparts a force onto the meat seated thereon, and thus, pierces the meat via the tenderizing teeth.

Although such mechanical methods and devices are effective in tenderizing the meat, the structural and functional disadvantages associated with such devices renders implementation of same problematic and messy, and presents potential health hazards.

More specifically, the exposed, unenclosed nature of such mechanical meat tenderizing devices, and the associated forceful striking or pounding of the meat by same, often results in the leakage and/or splattering of raw meat juices and/or particulate onto the food preparatory surface, the user, and/or surrounding food items. Such juices or particles are typically laden with harmful bacteria or other microorganisms that have a tendency to proliferate and, once introduced into the human digestive system, cause a number of health related problems symptomatic of food poisoning, such as loss of appetite, nausea, vomiting and diarrhea. Although such splatters and spills may be cleaned, it is often difficult to completely sanitize and eliminate all bacteria from the contaminated surfaces and/or food items.

Moreover, although some may place the meat between pieces of paper or plastic wrap in an attempt "capture" splatter of meat juices or particles during the tenderizing process, such a method often leads to the paper or plastic wrap sticking to the mallet or the meat, tearing as a result of the pointed protrusions of the mallet piercing therethrough, and/or bunching of the wrap, thereby requiring replacement or repositioning of same. In addition thereto, because of the relatively porous or breathable nature of paper and plastic wraps, utilization of such a method does not guard against bacterial proliferation.

Additionally, if the meat is placed upon a porous surface, such as a wooden cutting board, during the tenderizing process, washing the surface may reduce the number of harmful bacteria thereon, but will not entirely eliminate all the bacteria. As such, subsequent use of the porous surface for handling or preparing other food items will result in the contamination of such food items with the vestigial bacteria, thereby presenting the potential health hazards described above.

Another method of tenderizing and flavoring meat involves the application of an acid-based liquid marinade to the meat for purposes of denaturing or "unwinding" the long protein strands thereof. Such marinades are often applied to the meat within a sealable plastic bag, wherein the marinated meat is permitted to "sit" for a period to facilitate the tenderizing and flavoring process. However, many such marinades are ineffective in penetrating and infusing the meat and are, therefore, ineffective in denaturing the proteins. As such, those utilizing a marinade to tenderize raw meat are often forced to inject the marinade into the meat to facilitate the marinade-tenderizing process from therewithin.

Of course, attempting to utilize conventional mechanical tenderizing devices in conjunction with a liquid marinade to forcefully infuse the marinade into the meat, and therefore tenderize and flavor same, would inherently result in many of the above-referenced deficiencies; to wit, excessive splatter of the marinade, raw meat juices and meat particulate; thereby, presenting the above-referenced health risks.

Therefore, it is readily apparent that there is a need for an apparatus and method for selectively or contemporaneously tenderizing and marinating meats or other desired food items without the proliferation of harmful bacteria resulting from the leakage and/or splatter of raw meat juices and particulate, as is commonly experienced with the utilization and implementation of conventional meat tenderizing devices and methods.

BRIEF SUMMARY OF THE INVENTION

Briefly described, in a preferred embodiment, the present invention overcomes the above-mentioned disadvantages and meets the recognized need for such a device by providing an apparatus and method for selectively or contemporaneously tenderizing and marinating meats or other desired food items, wherein implementation of the present apparatus and method entails application of a sealable apparatus having a mechanical tenderizing assembly incorporated therein. Such device and method, accordingly, permits the sequestration and containment of raw meat juices, meat particulate, and/or marinade therewithin during the tenderizing process, and further, thereby eliminates leakage and/or splatter of same, while reducing or eliminating associated bacterial proliferation and contamination of surrounding surfaces or food items.

According to its major aspects and broadly stated, the present invention in its preferred form is an apparatus and method for selectively or contemporaneously tenderizing and marinating meats or other desired food items, having, in general, a sealable bag and mechanical tenderizing surfaces.

More specifically, the present invention is an apparatus and method for selectively or contemporaneously tenderizing and marinating meats or other desired food items, wherein the present invention is preferably in the form of a reusable, pliable, non-porous, reversible or invertible, sealable plastic or rubber bag having a plurality of pointed protrusions or tenderizing teeth integrally formed with the inner surfaces thereof. Implementation of the present method simply requires that the meat or other food item be placed within the bag, excess air forced out therefrom via hand-pressure or the like if required, and the subsequent closure or sealing of the bag via an incorporated rib-and-groove mechanism, ties, or other suitable closure mechanisms. Thereafter, the sealed bag is preferably repeatedly struck or pounded by the user's palm, fist, or other blunt object, to forcefully drive the plurality of tenderizing teeth into the meat, and thus tenderize same. Additionally, marinades may be selectively introduced into the bag to infuse the meat with same during the tenderizing process, or to simply marinade and flavor the meat without assistance from the tenderizing teeth.

As such, utilization of the present invention effectuates an enclosed, sanitary, and overall more effective tenderizing and marinating process in view of conventional prior art apparatuses and methods. Additionally, preferably owing to the pliable nature of the bag, the bag may be reversed or turned inside-out, thereby facilitating the effective cleaning and disinfecting of the bag's interior toothed surface via suitable cleansers or disinfectants, such as chlorine bleach, or the like.

Accordingly, a feature and advantage of the present invention is its ability to effectively tenderize meat within an enclosed structure.

Another feature and advantage of the present invention is its ability to effectively marinate meat within an enclosed structure.

Still another feature and advantage of the present invention is its ability to effectively tenderize meat within an enclosed structure, thus permitting the sequestration and containment of raw meat juices, meat particulate, and/or marinade therewithin during the tenderizing process, thereby eliminating leakage and/or splatter of same, and reducing or eliminating associated bacterial proliferation and contamination of surrounding surfaces or food items.

Yet another feature and advantage of the present invention is its ability to effectively marinate meat within an enclosed structure, thus permitting the sequestration and containment of raw meat juices, meat particulate, and/or marinade therewithin during the marinating process, thereby eliminating leakage and/or splatter of same, and reducing or eliminating associated bacterial proliferation and contamination of surrounding surfaces or food items.

Yet still another feature and advantage of the present invention is its ability to permit the selective or contemporaneous tenderization and/or marination of meats or other desired food items.

A further feature and advantage of the present invention is its ability to be reversed or turned inside-out, thereby facilitating the effective cleaning and disinfecting of the bag's toothed surfaces via suitable cleansers or disinfectants, such as chlorine bleach, or the like.

Still a further feature and advantage of the present invention is its ability to be sealed.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing FIGS., in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1-7, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
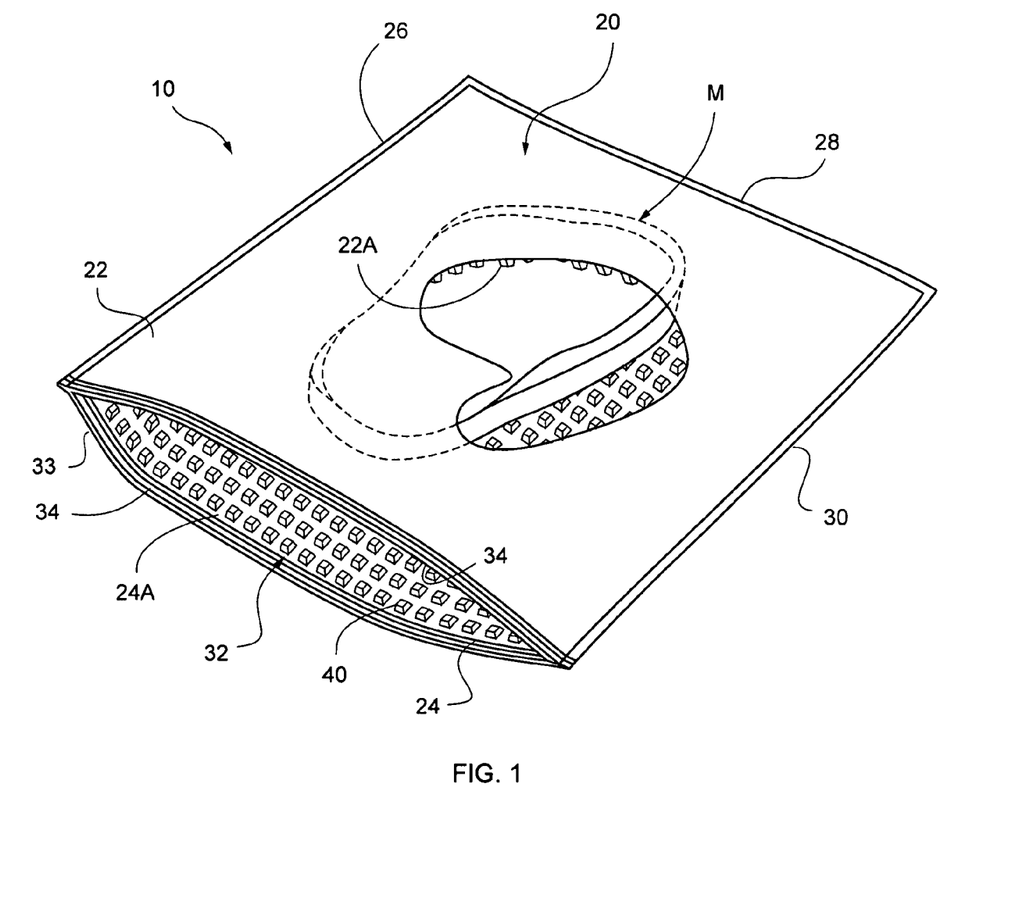
FIG. 1 is a perspective view of an apparatus for preparing food according to a preferred embodiment of the present invention.
Figure 2:
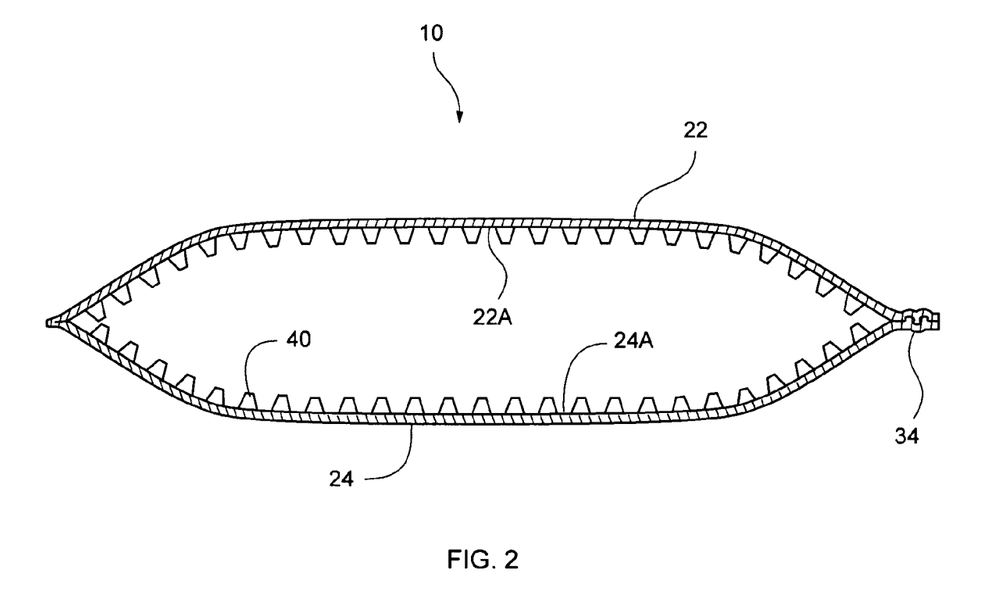
FIG. 2 is a cross-sectional view of an apparatus for preparing food according to a preferred embodiment of the present invention.

Referring now to FIGS. 1-2, the present invention in a preferred embodiment is an apparatus 10 for selectively or contemporaneously tenderizing and/or marinating meats or other desired food items, wherein apparatus 10 is preferably a substantially rectangular-shaped bag 20 comprising a plurality of pointed protrusions or tenderizing teeth 40 integrally formed with the interior surfaces thereof.

More specifically, bag 20 is preferably formed from a pliable, durable, non-porous plastic or rubber material that permits or facilitates reversibility or inversion of same for cleansing or sanitizing the interior surfaces thereof, thus promoting the reusability of bag 20 as more fully described below. Bag 20 preferably comprises upper wall 22 and lower wall 24, preferably hermitically sealed to one another along sides 26, 28 and 30, generally, of bag 20, thus yielding aperture or mouth 32 for introducing meat M or other food items into bag 20. Although sides 26, 28 and 30 of bag 20 are preferably hermitically sealed, it is contemplated in an alternate embodiment that other suitable methods and/or mechanisms of sealing sides 26, 28 and 30 of bag 20 could be utilized, such as, for exemplary purposes only, stitching, riveting, hot melt, permanent adhesives and/or integral formation.

Preferably, mouth 32 of bag 20 comprises closure or sealing mechanism 34 disposed proximal peripheral edge 33 of mouth 32, wherein sealing mechanism 34 is preferably in the form of a rib-and-groove mechanism; although other suitable mechanisms could be utilized, such as, for exemplary purposes only, ties, snap mechanisms, hook-and-loop fasteners, zippers, grommet-and-tie assemblies, rib-and-groove mechanisms incorporating slide bars to facilitate cooperative engagement of the rib-and-groove mechanism, and/or other suitable repeatably resealable mechanisms. It is further contemplated that upper wall 22 or lower wall 24 could incorporate a sealable closure flap extending from peripheral edge 33 of mouth 32 to facilitate the sealing or closure of mouth 32.

It should be recognized that sealed sides 26, 28 and 30 of bag 20, in conjunction with mouth 32 sealed via sealing mechanism 34, functionally provide for the sequestration and containment of raw meat juices, meat particulate, and/or marinade within bag 20, thereby eliminating leakage and/or splatter of same upon implementation of the preferred tenderization method more fully described below. Additionally, such a configuration further precludes the proliferation of meat-borne bacteria and/or the contamination of surrounding surfaces and food items by same.

Figure 3:
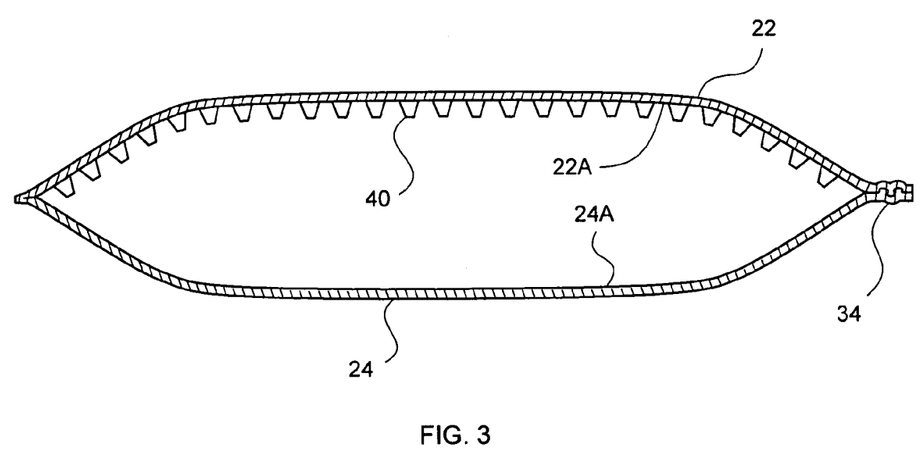
FIG. 3 is a cross-sectional view of an apparatus for preparing food according to an alternate embodiment of the present invention.

Inner surfaces 22A and 24A of upper wall 22 and lower wall 24, respectively, preferably comprise integrally formed tenderizing teeth 40 extending therefrom. Tenderizing teeth 40 are preferably substantially "blunted" pyramidal-shaped, as is known with the art, yet possess a sufficient angular dimension to effectively pierce the meat M or other food item placed within bag 20, as more fully described below. Although tenderizing teeth 40 are preferably substantially "blunted" pyramidal-shaped, it is contemplated in an alternate embodiment that tenderizing teeth 40 could possess other suitable configurations or shapes, such as, for exemplary purposes only, spikes of any selected angular dimension, rounded or dulled protuberances, tenderizing teeth of varying or alternating size, height, thickness, angular dimension or dispersion. Additionally, although tenderizing teeth 40 are disposed over the entirety of inner surfaces 22A and 24A of bag 20, it is contemplated in an alternate embodiment that tenderizing teeth 40 could be at least partially disposed on inner surfaces 22A and 24A in any selected concentration, dispersion, pattern or grouping, and/or disposed entirely or partially on at least one of inner surfaces 22A and 24A, as best illustrated in FIG. 3.

Implementation of the present method simply requires that meat M or other food item be placed within bag 20, excess air forced out therefrom via hand-pressure or the like if required, and the subsequent closure or sealing of bag 20 via sealing mechanism 34. Thereafter, sealed bag 20 is preferably repeatedly struck or pounded by the user's palm, fist, or other blunt object, to forcefully drive the plurality of tenderizing teeth 40 into meat M, and thus tenderize same. Additionally, marinades may be selectively introduced into bag 20 to infuse meat M with same during the tenderizing process, or to simply marinade and flavor meat M without assistance from tenderizing teeth 40.

As such, utilization of the present invention effectuates an enclosed, sanitary, and overall more effective tenderizing and marinating process in view of conventional prior art apparatuses and methods. Additionally, preferably owing to the pliable nature of bag 20, bag 20 may be reversed or turned inside-out, thereby facilitating the effective cleaning and disinfecting of inner surfaces 22A and 24A of bag 20, and tenderizing teeth 40, via suitable cleansers or disinfectants, such as chlorine bleach, or the like.

Figure 4:
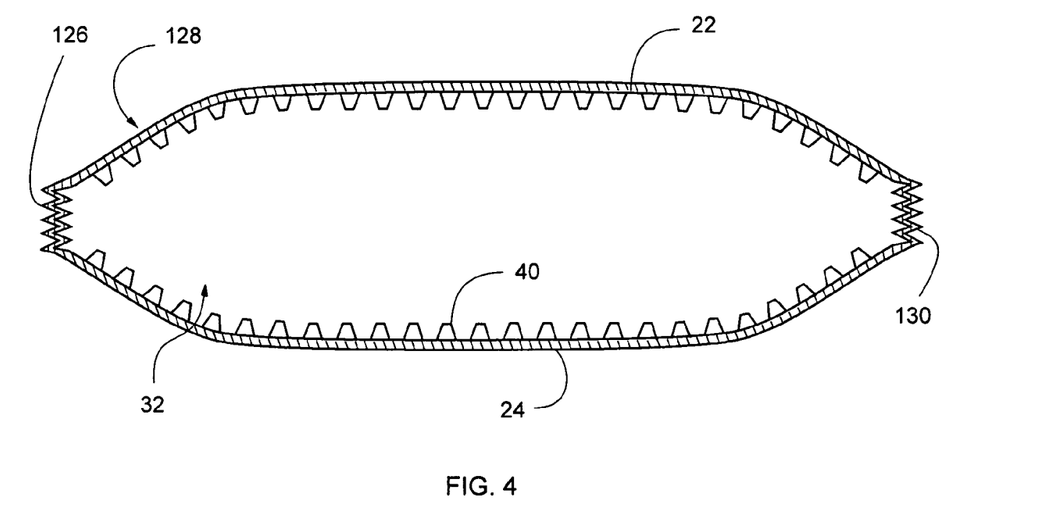
FIG. 4 is a cross-sectional view of an apparatus for preparing food according to an alternate embodiment of the present invention.

Referring now more specifically to FIG. 4, illustrated therein is an alternate embodiment of bag 20, wherein the alternate embodiment of FIG. 4 is substantially equivalent in form and function to that of the preferred embodiment detailed and illustrated in FIGS. 1-2 except as hereinafter specifically referenced. Specifically, the embodiment of FIG. 4 replaces the flat, singled seamed sides 26, 28 and 30 of bag 20 with expandable, pleated or accordion-like sides 126, 128 and 130, respectively, to facilitate incremental expansion of the overall volumetric capacity of bag 20, thereby permitting the placement therein of larger cuts of meat or other food items for tenderization of same.

Figure 5:
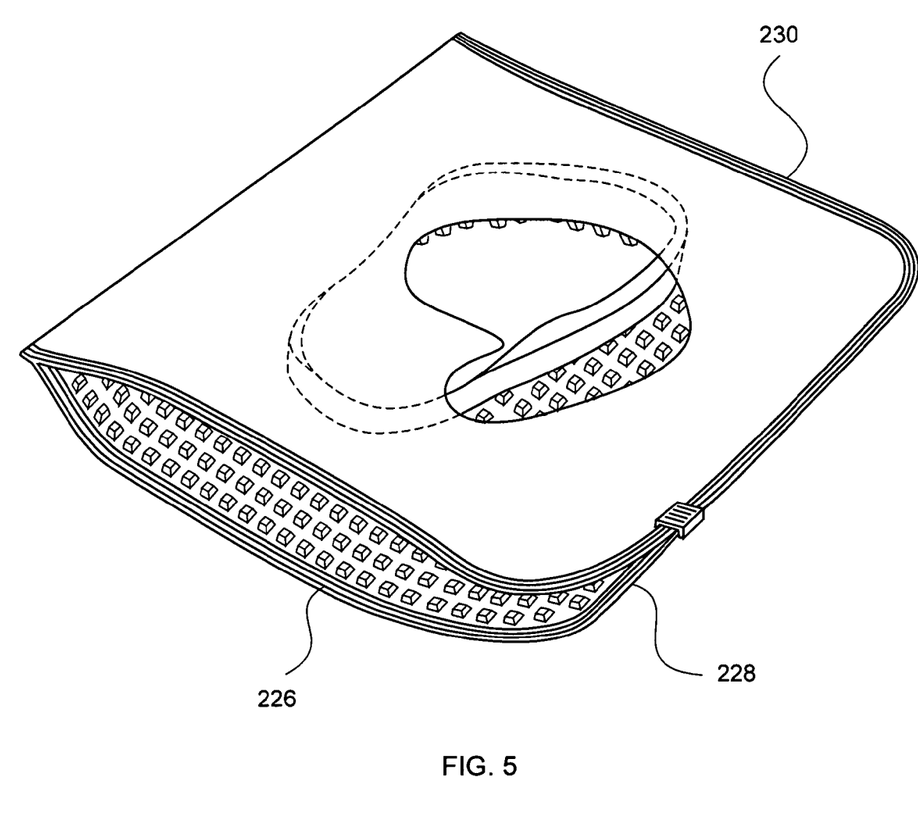
FIG. 5 is a perspective view of an apparatus for preparing food according to an alternate embodiment of the present invention.

Referring now more specifically to FIG. 5, illustrated therein is an alternate embodiment of bag 20, wherein the alternate embodiment of FIG. 5 is substantially equivalent in form and function to that of the preferred embodiment detailed and illustrated in FIGS. 1-2 except as hereinafter specifically referenced. Specifically, the embodiment of FIG. 5 replaces the flat, singled-seamed sides 26, 28 and 30 of bag 20 with repeatably resealable sides 226, 228, 230 in the form of a slide bar or zippered rib-and-groove mechanism; although other suitable repeatably resealable mechanisms could be utilized. Such a configuration facilitates the general opening of bag 20 and thus, the access, placement, centering and/or positioning of meat M or other food items therewithin, and/or the removal of same therefrom. It is further contemplated that any selected number of sides of bag 20 could incorporate repeatably resealable mechanisms.

Figure 6:
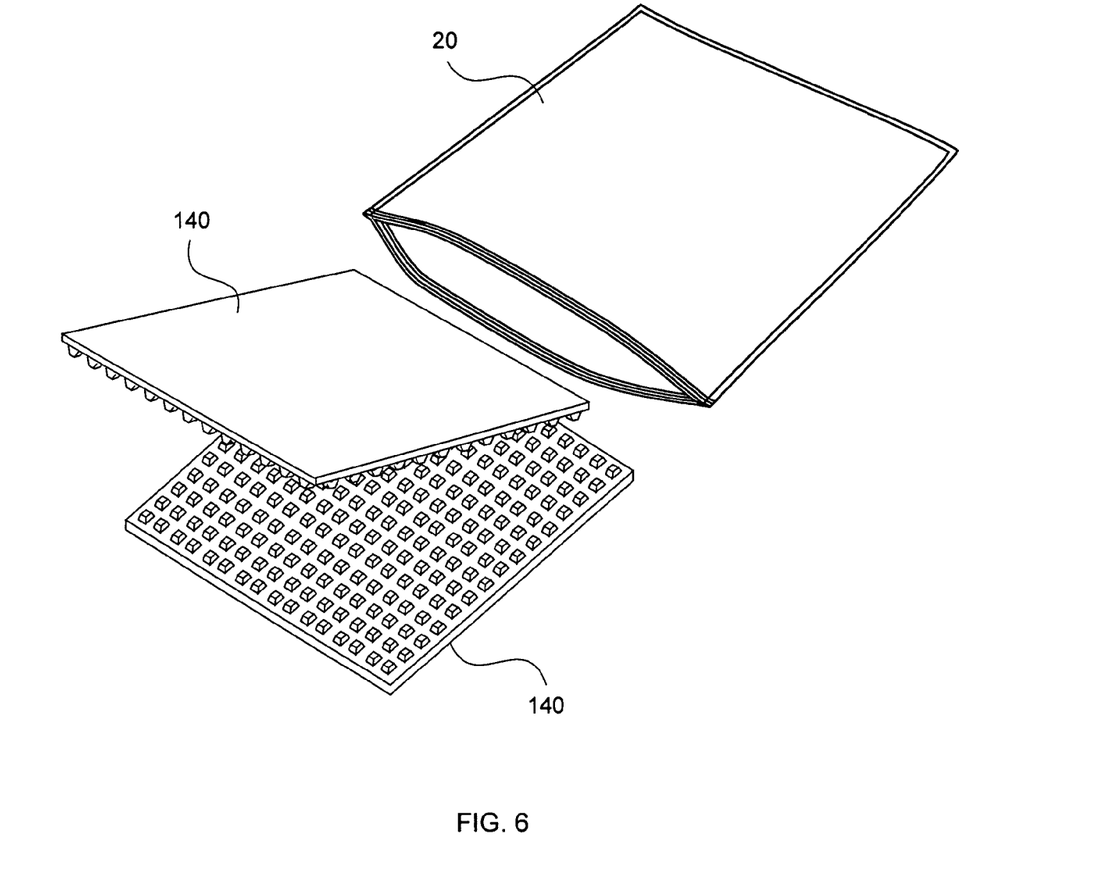
FIG. 6 is a perspective view of an apparatus for preparing food according to an alternate embodiment of the present invention; and, FIG. 7 is a perspective view of an apparatus for preparing food according to an alternate embodiment of the present invention.

Referring now more specifically to FIG. 6, illustrated therein is an alternate embodiment of bag 20, wherein the alternate embodiment of FIG. 6 is substantially equivalent in form and function to that of the preferred embodiment detailed and illustrated in FIGS. 1-2 except as hereinafter specifically referenced. Specifically, the embodiment of FIG. 6 replaces integrally formed tenderizing teeth 40 with removable or interchangeable tenderizing plates 140, wherein tenderizing plates 140 could incorporate any suitable form of tenderizing surface, such as, for exemplary purposes only, tenderizing teeth entirely, or at least partially, disposed thereon in any selected concentration, dispersion, pattern or grouping, and/or disposed entirely or partially on at least one of the tenderizing plates 140. Additionally, at least one of tenderizing plates 140 could possess a substantially flat, hard surface, intended to provide a juxtaposed, meat-supporting surface against which meat can be struck. Furthermore, it is contemplated that a plurality of such tenderizing plates 140 could be placed within bag 20, wherein different meats or food items could be interspersed therebetween for tenderizing and/or marinating same in accord with the present inventive method.

Figure 7:
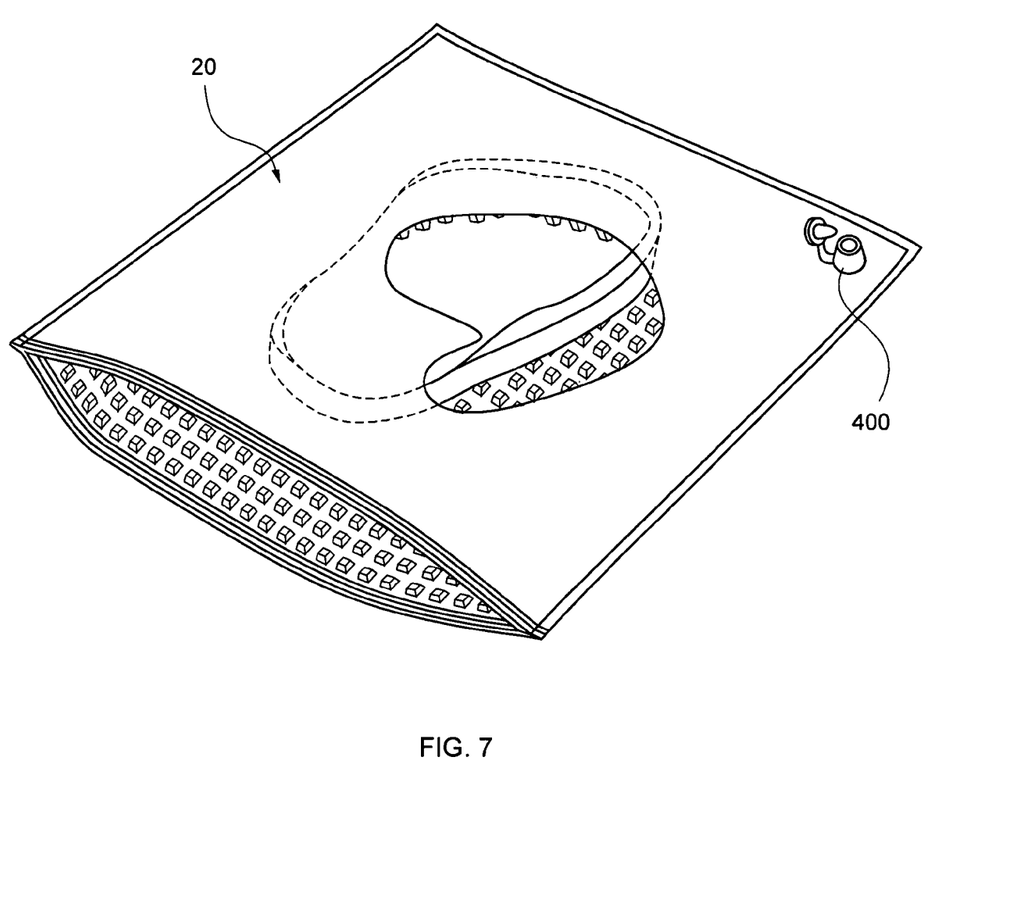

Referring now more specifically to FIG. 7, illustrated therein is an alternate embodiment of bag 20, wherein the alternate embodiment of FIG. 7 is substantially equivalent in form and function to that of the preferred embodiment detailed and illustrated in FIGS. 1-2 except as hereinafter specifically referenced. Specifically, the embodiment of FIG. 7 incorporates a stoppered drainage spout 400 to facilitate the tidy drainage and disposal of marinades, meat juices and/or meat particulate from bag 20.

It is contemplated in another alternate embodiment that bag 20 could be dishwasher-safe.

It is contemplated in another alternate embodiment that bag 20 could incorporate an automated air expeller or vacuum pump/sealer to facilitate vacuum sealing of bag 10.

In such an embodiment, it is contemplated that the vacuum sealer could be connected to drainage spout 400 to draw air from bag 20.

It is contemplated in still another alternate embodiment that bag 20 could be manufactured to any size and/or shape.

It is contemplated in yet another alternate embodiment that bag 20 could be manufactured to be disposable after a first or select number of uses.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus and method for selectively or contemporaneously tenderizing and marinating meats or other selected food items, said apparatus comprising:
   a bag comprising a mechanical tenderizing surface disposed therewithin,
   wherein said mechanical tenderizing surface comprises a plurality of protuberances, and
   wherein said protuberances are sufficiently rigid to at least one of deform and penetrate an external surface of the meat or other selected food item disposed within said bag, and to thereby tenderize same,
   wherein said mechanical tenderizing surface is in the form of a removably interchangeable tenderizing plate, said tenderizing plate comprising a mechanical tenderizing surface at least partially disposed thereon.

2. The apparatus of claim 1, wherein said bag is formed from a non-porous plastic.

3. The apparatus of claim 1, wherein said bag is reversible or invertible.

4. The apparatus of claim 1, wherein said bag comprises at least one opening.

5. The apparatus of claim 4, wherein said at least one opening is selectively sealable via a repeatably resealable mechanism selected from the group consisting of rib-and-groove mechanisms, ties, snap mechanisms, hook-and-loop fasteners, zippers, grommet-and-tie assemblies, and rib-and-groove mechanisms incorporating slide bars to facilitate cooperative engagement of the rib-and-groove mechanism.

6. The apparatus of claim 4, further comprising at least one sealed side.

7. The apparatus of claim 6, wherein said at least one sealed side is selected from the group consisting of hermetically sealed sides, single-seamed sides, and pleated sides.

8. The apparatus of claim 4, further comprising at least one selectively sealable side comprising a repeatably resealable mechanism selected from the group consisting of rib-and-groove mechanisms, ties, snap mechanisms, hook-and-loop fasteners, zippers, grommet-and-tie assemblies, and rib-and-groove mechanisms incorporating slide bars to facilitate cooperative engagement of the rib-and-groove mechanism.

9. The apparatus of claim 1, wherein said mechanical tenderizing surface is integrally formed with said bag.

10. The apparatus of claim 9, wherein said protuberances are selected from the group consisting of tenderizing teeth, "blunted" pyramidal-shaped tenderizing teeth, spikes of any selected angular dimension, rounded protuberances, dulled protuberances, tenderizing teeth of varying or alternating size, tenderizing teeth of varying or alternating height, tenderizing teeth of varying or alternating thickness, tenderizing teeth of varying or alternating angular dimension, tenderizing teeth of varying or alternating dispersion, tenderizing teeth of varying or alternating concentration, tenderizing teeth of varying or alternating pattern, tenderizing teeth of varying or alternating grouping, flat tenderizing surfaces, and combinations thereof.

11. The apparatus of claim 9, wherein said mechanical tenderizing surface is at least partially disposed on at least one inner surface of said bag.

12. The apparatus of claim 1, wherein said protuberances are selected from the group consisting of tenderizing teeth, "blunted" pyramidal-shaped tenderizing teeth, spikes of any selected angular dimension, rounded protuberances, dulled protuberances, tenderizing teeth of varying or alternating size, tenderizing teeth of varying or alternating height, tenderizing teeth of varying or alternating thickness, tenderizing teeth of varying or alternating angular dimension, tenderizing teeth of varying or alternating dispersion, tenderizing teeth of varying or alternating concentration, tenderizing teeth of varying or alternating pattern, tenderizing teeth of varying or alternating grouping, flat tenderizing surfaces, and combinations thereof.

13. The apparatus of claim 1, further comprising a stoppered drainage spout carried by said bag.

14. A method of selectively or contemporaneously tenderizing and marinating meats or other desired food items without the proliferation of harmful bacteria resulting from the leakage and/or splatter of raw meat juices, particulate, or the like, said method comprising the steps of:
   a. obtaining a bag comprising a mechanical tenderizing surface disposed therewithin, said mechanical tenderizing surface comprising a plurality of protuberances, said protuberances extending generally perpendicularly from a surface;
   b. placing the meat or other desired food item within said bag for tenderizing same; and
   c. at least one of deforming and penetrating an external surface of the meat or other desired food item to tenderize at least the external surface of the meat or other desired food item.

15. The method of claim 14, further comprising the step of selectively introducing a marinade within said bag.

16. The method of claim 14, further comprising the step of releasable sealing at least one opening of said bag via a repeatably resealable mechanism carried by said at least on opening, said repeatably resealable mechanism selected from the group consisting of rib-and-groove mechanisms, ties, snap mechanisms, hook-and-loop fasteners, zippers, grommet-and-tie assemblies, and rib-and-groove mechanisms incorporating slide bars to facilitate cooperative engagement of the rib-and-groove mechanism.

17. The method of claim 16, wherein the step of at least one of deforming and penetrating comprises repeatably striking and pounding said bag via one's palm, fist, or other blunt object, to forcefully drive at least a portion of said protuberances of said mechanical tenderizing surface into the meat or other desired food item to tenderize same.

18. The method of claim 16, wherein said protuberances are selected from the group consisting of tenderizing teeth, "blunted" pyramidal-shaped tenderizing teeth, spikes of any selected angular dimension, rounded protuberances, dulled protuberances, tenderizing teeth of varying or alternating size, tenderizing teeth of varying or alternating height, tenderizing teeth of varying or alternating thickness, tenderizing teeth of varying or alternating angular dimension, tenderizing teeth of varying or alternating dispersion, tenderizing teeth of varying or alternating concentration, tenderizing teeth of varying or alternating pattern, tenderizing teeth of varying or alternating grouping, flat tenderizing surfaces, and combinations thereof.

19. The method of claim 18, wherein said mechanical tenderizing surface is at least partially disposed on at least one inner surface of said bag.

* * * * *